(12) United States Patent
Traub et al.

(10) Patent No.: US 12,125,323 B2
(45) Date of Patent: Oct. 22, 2024

(54) RECORDING OF EQUIPMENT OF AN EMERGENCY VEHICLE

(71) Applicant: ZF Friedrichshafen AG, Friedrichshafen (DE)

(72) Inventors: Stefan Traub, Friedrichshafen (DE); Alan Dittrich, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/123,575

(22) Filed: Mar. 20, 2023

(65) Prior Publication Data

US 2023/0306798 A1   Sep. 28, 2023

(30) Foreign Application Priority Data

Mar. 24, 2022 (DE) ................. 10 2022 202 875.9

(51) Int. Cl.
*G07C 5/08* (2006.01)
*G06K 7/10* (2006.01)
*G07C 5/00* (2006.01)

(52) U.S. Cl.
CPC ........... *G07C 5/08* (2013.01); *G06K 7/10366* (2013.01); *G07C 5/008* (2013.01)

(58) Field of Classification Search
CPC ....... G07C 5/08; G07C 5/008; G06K 7/10366
See application file for complete search history.

(56) References Cited

U.S. PATENT DOCUMENTS

| | | | |
|---|---|---|---|
| 2004/0004547 A1 | 1/2004 | Appelt et al. | |
| 2005/0035852 A1* | 2/2005 | Paulsen | G07C 5/085 340/572.1 |
| 2018/0289999 A1 | 10/2018 | Kay et al. | |

FOREIGN PATENT DOCUMENTS

DE   10 2006 004 443 A1   8/2007

OTHER PUBLICATIONS

German Patent Office, Office Action issued in German patent application No. 10 2022 202 875.9 (Feb. 10, 2023).

* cited by examiner

*Primary Examiner* — Jamara A Franklin
(74) *Attorney, Agent, or Firm* — Finch & Maloney PLLC

(57) ABSTRACT

Disclosed is a method for registering items of equipment (103) for a vehicle. In each case an ID code is assigned to the items of equipment (103) and wherein the items of equipment (103) comprise in each case at least one transmission means (105). The ID codes are transmitted by the transmission means (105) concerned to the recording means (101) and registered by the recording means (101).

16 Claims, 1 Drawing Sheet

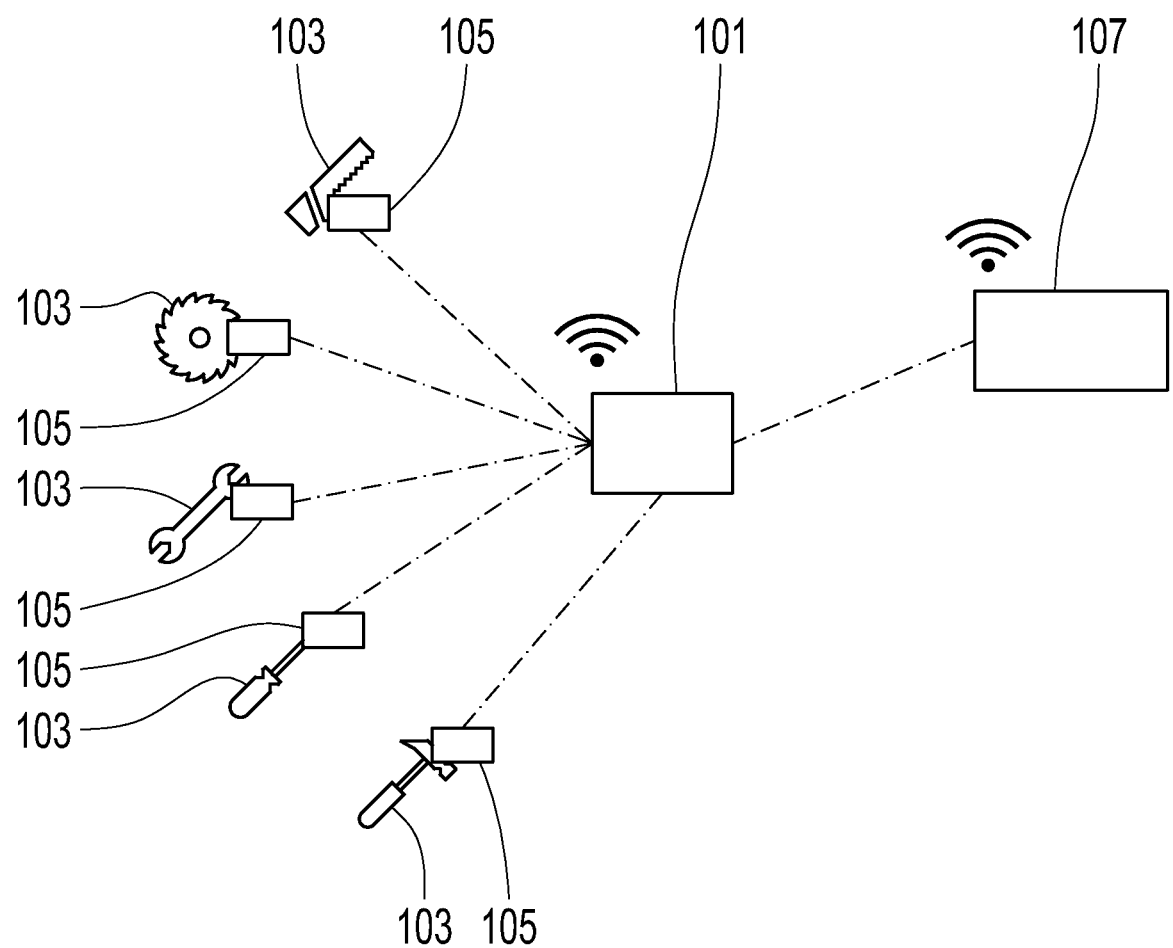

RECORDING OF EQUIPMENT OF AN EMERGENCY VEHICLE

RELATED APPLICATIONS

This application claims the benefit of and right of priority under 35 U.S.C. § 119 to German Patent Application no. 10 2022 202 875.9, filed on 24 Mar. 2022, the contents of which are incorporated herein by reference in its entirety.

FIELD OF THE DISCLOSURE

The invention relates to a method of registering items of equipment for a vehicle, a computer program for carrying out the method, a vehicle with recording means for carrying out the method, a building with a recording means for carrying out the method, and an item of equipment with measurement means for use in the method.

BACKGROUND

Items of equipment for use in rescues are checked and serviced before and after use by a so-termed equipment servicing facility. This servicing and checking takes place with reference to entries in manually prepared tables.

SUMMARY

The purpose of the present invention is to improve the management of items of equipment used in rescue operations. This objective is achieved by a method for registering items of equipment, a computer program for carrying out the method, a vehicle configured for carrying out the method, a vehicle having a transmission means, a building configured to carry out the method, and an item of equipment with transmission means. Additional embodiments and preferred further developments will be apparent in light of the description given below.

The method according to the invention serves for the registration of items of equipment for a vehicle. The said vehicle is preferably an emergency vehicle, in particular a rescue vehicle, i.e. a vehicle used by a rescue service, such as a fire engine or an ambulance.

Items of equipment are ones such as tools, machines and/or consumables which are carried in the vehicle. In particular, such items can be objects used for activities in the context of rescues.

Each item of equipment is assigned an ID code. An ID code, also called an identifier, denotes a feature for the identification of an object. The object can be identified with reference to an expression of the said feature linked with the object. Correspondingly, various objects and various expressions of the ID code are uniquely associated with one another. In the present context the ID codes serve to identify the items of equipment. Thus, an expression of the ID code is uniquely linked to each item of equipment.

The items of equipment each comprise at least one transmission means. Preferably, a Bluetooth tag serves as the transmission means. The ID code is suitable as the identifier of the item of equipment.

According to the invention, a recording means is provided for registering the ID codes. "Registering" means "receiving" and thereafter "storing," "further processing" and/or "relaying."

The invention provides that the ID codes of the items of equipment are transmitted by the transmission means of the respective items of equipment to the recording means and are recorded by the recording means. Thus, the recording means receives the ID codes and stores them, processes them further, and/or passes them on. The transmission preferably takes place by wireless means, for example by radio. If Bluetooth tags are use as transmission means, the transmission of the ID codes or Bluetooth IDs correspondingly takes place by way of a Bluetooth connection between the transmission means concerned and the recording means.

Thanks to the method according to the invention the registering of the items of equipment is simplified. In particular, the items of equipment can be recorded automatically and therefore more efficiently and reliably.

In a preferred further development, all the ID codes of the items of equipment located within a detection range of the recording means are transmitted by the transmission means of the item of equipment concerned to the recording means and registered by the recording means. The detection range is a spatial area around the recording means, which contains the recording means. The distinguishing feature of the detection range is that data of objects located within the detection range can be transmitted to the recording means and received by the recording means. Conversely, data of objects located outside the detection range are not received by the recording means.

The said further development enables a spatial allocation of items of equipment to the recording means. Thus, the items of equipment whose ID codes are transmitted to the transmission means and which are received by the transmission means, are within the detection range and therefore in the spatial vicinity of the recording means. This is the more so for a small detection range. A smaller detection range can therefore be used to good advantage in the context of the said further development.

Preferably, the recording means is installed in or on the vehicle. This means that the vehicle comprises the recording means. A physical connection exists between the vehicle and the recording means. In that way a spatial association with the vehicle is made possible. In particular, the items of equipment can be spatially associated with the vehicle if the ID codes of all the items of equipment located within the detection range of the recording means are transmitted by the transmission means of the item of equipment concerned to the recording means and received by the recording means.

By designing the recording means in such manner that its detection range corresponds spatially to the dimensions of the vehicle, it can be determined which items of equipment are present in the vehicle. Then, all the items of equipment present in the vehicle are at the same time within the detection range of the recording means and can correspondingly be registered by transmitting their ID codes. In that way, the emergency services obtain on the spot information about what items of equipment are present in which vehicle.

Preferably, the method is further developed in such manner that when an item of equipment moves outside the detection range of the recording means, this fact is detected. Thus, at least one point in time is determined at which an item of equipment moves outside the detection range of the recording means. Preferably, this is registered by the recording means.

Such a further development can possibly be realized if the recording means receives and registers the ID codes of all the items of equipment within its detection range recursively, in other words in repeatedly carried out loops. The ID codes registered in each case are compared with the ID codes registered in the respective previous recursion. If it is found that some ID codes are missing, this means that the corresponding items of equipment have been removed from the vehicle. If new or previously removed items of equipment are loaded into the vehicle, then this is reflected in corresponding ID codes which are registered in a particular recursive loop for the first time.

In a corresponding preferred further development, it is registered when an item of equipment moves into the detection range of the recording means. Thus, at least one point in time is registered, preferably by the recording means, at which an item of equipment moves into the detection range of the recording means. By constantly registering the items of equipment that move out of and into the detection range, a list can be prepared and updated automatically to show the items of equipment present in the vehicle at any time.

In a preferred further development, a time span can be determined between the time when the particular item of equipment moves out of the detection range of the recording means and the time when the same item of equipment moves back into the detection range of the recording means. Preferably, this time span is determined by the recording means.

Preferably, the time spans determined in each case for at least one item of equipment are summed. This means in particular that the time spans between the time-point when the at least one item of equipment moves out of the detection range of the recording means and the time-point when the same item of equipment moves back into the detection range of the recording means, are determined recursively. The time spans determined in each individual recursive loop are then summed.

The sum of the said time spans obtained is a measure of the time during which the at least one item of equipment has been in use. If a specified utilization time is exceeded, then—if necessary, having regard to further conditions—maintenance is due. Thus, this further development enables an automatic preparation of maintenance schedules.

The maintenance can be planned in even greater detail if environmental factors that affect the item of equipment concerned are taken into account. In a preferred further development, these environmental factors are measured. For that purpose, at least one item of equipment comprises at least one measurement means for determining one or more physical values of one or more environmental parameters, i.e. one or more physical variables that affect the item of equipment, for example the ambient temperature, air humidity and/or vibrations. The values are transmitted by the transmission means to the recording means, preferably without contact, and are registered by the recording means.

Preferably, the item of equipment comprises at least one storage means. The method is preferably developed further in such manner that the values measured by the measurement means are stored in the storage means when the item of equipment is outside the detection range of the recording means, for example while in use. If the item of equipment is returned to the vehicle after its use has ended, it comes back into the detection range of the recording means. The said further development provides that the stored values are then transmitted by the transmission means to the recording means. This enables a transmission of the measured values even when the item of equipment is in use outside the detection range of the recording means.

In a preferred further development, the time spans and/or the measured values transmitted to the recording means together with the ID code of the item of equipment concerned are stored. Thus, when an item of equipment moves out of the detection range of the recording means, the time until the same item of equipment comes back into the detection range and/or the measured values of the physical variables that act upon the said item of equipment during that time, are stored together with the ID code of the item of equipment concerned. The data so stored correspond to the previously manually drawn up maintenance schedules. The method developed further in that way thus enables the automated preparation of a maintenance schedule.

The ID codes, points in time, time spans and/or values of physical variables are preferably transmitted by the recording means to a central computer in which a central maintenance management system is implemented. In the central maintenance management system activities for the maintenance and servicing of the items of equipment can be planned automatically or in an automated manner. In particular, components subjected to wear can be reordered automatically or in an automated manner and work contracts and the storage location of the item of equipment concerned in a vehicle can be booked.

In a preferred further development, the location of the vehicle can be identified. Owing to the above-described spatial allocation of the items of equipment to the vehicle, a corresponding location, or the position of the vehicle determined by way of the location, can be associated with the items of equipment registered. In that way servicing facilities receive on the spot information about the place where items of equipment are to be found, and which ones are there.

Advantageously, as an alternative the recording means can be at a fixed location. For example, the recording means can be installed in a particular building, i.e. in a building such as a fire station or a rescue station. In particular, the recording means can be fixed on a hall gate.

In a preferred further development, the items of equipment are registered when the vehicle is at least partially or preferably completely within the detection range of the recording means. In particular, the items of equipment can be registered when the rescue vehicle drives through the hall gate and thereby moves past a recording means fixed on the hall gate. Such a further development is advantageous because only one recording means is needed. In that way the installation costs can be kept low.

A computer program according to the invention implements the method according to the invention or a preferred further development of the method. Thus, the computer contains instructions for carrying out the method according to the invention or a further development thereof and is therefore designed to carry out the method or a preferred further development thereof. This means that the computer program causes a computer to carry out the method or a preferred further development thereof when the computer program is run on the computer. The computer program can be stored on a storage medium or it can be coded in one or more signals that can be transmitted. In particular the computer program can be available as a computer program product, i.e. as a unit that can be traded or a unit which serves the purpose of transferring ownership of the computer program.

The computer program can be contained in a computer. Such a computer is designed or set up to carry out the method or a preferred further development thereof. In particular, the computer can be the above-described recording means and/or the central computer.

A vehicle according to the invention is characterized by at least one recording means which is designed to carry out one of the above-described further developments that relate to a recording means installed on the vehicle.

The vehicle is preferably developed further with at least one transmission means for transmitting the ID codes and time-points registered and the time spans and/or the measured values determined. The transmissions can be made, for example, to a mobile terminal of a task-force leader or to a central computer at a control center.

The above-described building containing at least one recording means is in accordance with the invention.

BRIEF DESCRIPTION OF THE DRAWING

According to a preferred further development, the item of equipment also comprises at least one measurement means as described earlier.

The preferred example embodiment of the invention is illustrated in FIG. 1, which shows, in detail:

FIG. 1: A Bluetooth-based system for registering items of equipment in an emergency vehicle.

DETAILED DESCRIPTION

According to FIG. 1 the emergency vehicle contains an ECU (electronic control unit) 101. In the vehicle there are various items of equipment 103. Each item of equipment 103 is provided with a Bluetooth tag 105. The item of equipment 103 concerned can be identified by virtue of its Bluetooth tag 105.

The ECU 101 is able to read out the Bluetooth tags 105 located within its detection range. By iterative reading-out, the ECU 101 determines which Bluetooth tags 105 and hence which items of equipment 103 are within its detection range. Since the ECU 101 is built into the emergency vehicle, this correlates with the items of equipment present in the emergency vehicle.

If an item of equipment 103 is removed from the emergency vehicle, its Bluetooth tag 105 moves out of the detection range of the ECU. From this the ECU 101 can conclude that the item of equipment 103 has been removed. If the corresponding Bluetooth tag 105 reappears in the detection range of the ECU 101, this means that the corresponding item of equipment 103 has been brought back into the emergency vehicle. In that way the ECU 101 can at any time keep an up-to-date list of the items of equipment 103 present in the emergency vehicle.

By way of an appropriate data connection the ECU 101 transmits the said list to a central computer 107. The list can also be transmitted to a mobile terminal of a task-force leader.

INDEXES

101 ECU
103 Item of equipment
105 Bluetooth tag
107 Central computer

The invention claimed is:

1. A method for registering items of equipment to be transported by a vehicle and designed to be removed from the vehicle during use, the method comprising:
providing a system comprising a recording means and items of equipment, and each of the items of equipment comprising at least one transmission means;
assigning an ID code to each of the items of equipment;
transmitting the ID code by the at least one transmission means of one or more of the items of equipment;
receiving, at the recording means, the ID code of the one or more of the items of equipment;
registering, by the recording means, the ID code of the one or more of the items of equipment;
positioning each of the one or more items of equipment within a detection range of the recording means; and
determining a time span of how long each one of the one of the items of equipment, designed to be removed from the vehicle, remains out of the detection range of the recording means.

2. The method according to claim 1, further comprising arranging the recording means in or on a vehicle.

3. The method according to claim 2, comprising:
identifying the vehicle location; and
associating a corresponding location with the registered items of the items of equipment.

4. The method according to claim 1, further comprising:
detecting when one of the items of equipment moves out of the detection range of the recording means; and
registering, by the recording means, the ID code of the one of the items of equipment at a point in time at which the one of the items of equipment moves out of the detection range.

5. The method according to claim 4, further comprising:
detecting when the one of the items of equipment moves back into the detection range of the recording means; and
registering the ID code of the one of the items of equipment.

6. The method according to claim 5, wherein
each of the items of equipment comprises at least one measurement means configured for measuring one or more values of one or more physical variables of the item of equipment; and the method further comprising:
transmitting to the recording means, by the transmission means, the one or more values; and
registering, by the recording means, the one or more values.

7. The method according to claim 6, wherein each of the items of equipment comprises at least one storage means configured to store the values when the item of equipment is moved outside the detection range, and the method further comprising:
transmitting, by the transmission means, the stored values to the recording means when the item of equipment is moved within the detection range.

8. The method according to claim 7, wherein the ID code of an individual item of the items of equipment is stored together with the time span and/or the transmitted values.

9. The method according to claim 6, further comprising providing a vehicle with at least one of the recording means located therein which is configured for carrying out the method.

10. The method according to claim 6, further comprising that the at least one transmission means transmits the ID codes registered, the at least one time-point registered, the time span and/or the values determined.

11. The method according to claim 1, further comprising locating the recording means in a fixed location, and configuring the system to register the items of equipment when the vehicle is located at least partially in a detection range of the recording means.

12. The method according to claim 11, further comprising using a building as the fixed location.

13. The method according to claim 1, further comprising using a computer program product which is configured for carrying out the method.

14. A method for registering items of equipment to be transported by a vehicle and removed from the vehicle during use, the method comprising:
- providing a system comprising a recording means and items of equipment, and each of the items of equipment comprising at least one transmission means;
- assigning an ID code to each of the items of equipment;
- transmitting the ID code by the at least one transmission means of one or more of the items of equipment;
- receiving, at the recording means, the ID code of the one or more of the items of equipment;
- registering, by the recording means, the ID code of the one or more of the items of equipment;
- positioning each of the one or more items of equipment within a detection range of the recording means;
- determining when each one of the items of equipment moves out of the detection range of the recording means;
- determining when each one of the items of equipment moves back into the detection range of the recording means; and
- determining a time span from a time-point when each one of the one of the items of equipment moves out of the detection range until a time-point when each one of the items of equipment moves back into the detection range.

15. An item of equipment to be transported by a vehicle, the item of equipment, designed to be removed from the vehicle during use, having with at least one transmission means configured for transmitting an ID code of the item of equipment, and transmitting one or more stored values for one or more physical variables of the item of equipment when the item of equipment is within detection range of a recording means; and
- the item of equipment being positioned within the detection range of the recording means;
- determining when the item of equipment moves out of the detection range of the recording means;
- determining when the item of equipment moves back into the detection range of the recording means; and
- determining a time span from a time-point when the item of equipment moved out of the detection range until a time-point when the item of equipment moves back into the detection range.

16. The item of equipment according to claim 15, further comprising at least one measurement means configured for measuring the one or more stored values for the one or more physical variables of the item of equipment.

* * * * *